Patented Feb. 9, 1954

2,668,821

UNITED STATES PATENT OFFICE 2,668,821

S-(ETHYLXANTHOYL) O-ETHYL METHANETHIOLPHOSPHONATE

Henry Tolkmith, Midland, Mich., assignor to The Dow Chemical Company, Midland, Mich., a corporation of Delaware No Drawing. Application April 21, 1953, Serial No. 350,234

1 Claim. (Cl. 260—455)

The present invention is directed to S-(ethylxanthoyl) O-ethyl methanethiolphosphonate of the formula

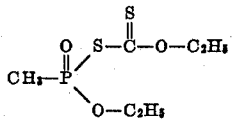

This compound is a viscous oil, somewhat soluble in many organic solvents and substantially insoluble in water. It is of value as an intermediate of the preparation of more complex phosphorus derivatives and as a toxic constituent of parasiticide compositions.

The new compound may be prepared by reacting one molecular proportion of an alkali metal ethylate with one molecular proportion of S-(ethylxanthoyl) methanethiolphosphonic chloride of the formula

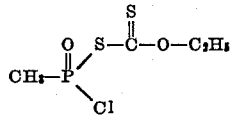

in an inert organic solvent such as benzene. In practice, sodium ethylate is preferably employed as the alkali metal ethylate reactant.

In carrying out the reaction, the sodium ethylate is added portionwise with stirring to the S-(ethylxanthoyl) methanethiolphosphonic chloride dispersed in the solvent and the resulting mixture thereafter heated for a period of time at a temperature of from 35° to 80° C. to complete the reaction. The reaction is somewhat exothermic and takes place smoothly at the temperature range of from 30° to 80° C. The temperature may be controlled by regulation of the rate of contacting the reactants, as well as by the addition or subtraction of heat, if required. Since the desired product has a tendency to decompose at temperatures in excess of 80° C., temperatures substantially in excess of 80° C. for any appreciable period of time should be avoided. If desired, an alcoholic solution of the ethylate may be employed as a starting material. It has been found that the excess alcohol does not interfere with the course of the reaction. Upon completion of the reaction, the mixture may be filtered and the filtrate distilled under reduced pressure at gradually increasing temperatures up to a temperature of 80° C. to separate low boiling constituents and to obtain as a residue the desired S-(ethylxanthoyl) O-ethyl methanethiolphosphonate.

The S - (ethylxanthoyl) methanethiolphosphonic chloride employed as a starting material in the above-described method may be prepared by reacting one molecular proportion of sodium ethylxanthate with one molecular proportion of methanephosphonic dichloride in an inert organic solvent such as benzene. In carrying out the reaction, the sodium ethylxanthate is added with stirring to the methanephosphonic dichloride dispersed in the solvent and the resulting mixture heated for a period of time at a temperature of from 35° to 80° C. To avoid decomposition, temperatures substantially in excess of 80° C. for any appreciable period of time should not be employed. Upon completion of the reaction, the mixture may be filtered and the filtrate concentrated by distillation under reduced pressure to a temperature up to 80° C. to obtain as a residue the desired S-(ethylxanthoyl methanethiolphosphonic chloride. This product is a viscous oil having a density of 1.245 at 20° C. The latter compound and described method for its preparation constitute the subject matter of my copending application Serial No. 203,759, filed December 30, 1950.

In a representative preparation, a solution of 2.6 grams (0.038 mole) of sodium ethylate in 12 milliliters of ethanol was added portionwise with stirring and cooling to 8.25 grams (0.038 mole) of S-(ethylxanthoyl) methanethiolphosphonic chloride dispersed in 50 milliliters of benzene and the resulting mixture thereafter heated for 2 hours at a temperature of 60° C. to complete the reaction. At the end of this period, the mixture was filtered and the filtrate concentrated by distillation under reduced pressure to a temperature up to 60° C. to obtain as a residue an S-(ethylxanthoyl) O-ethyl methanethiolphosphonate product. The latter is a viscous oil having a density of 1.127 at 12° C.

The new S-(ethylxanthoyl) O-ethyl methane thiolphosphonate product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic phosphonate.

This is a continuation in part of my copending application Serial No. 203,762, filed December 30, 1950.

I claim:

S-(ethylxanthoyl) O-ethyl methanethiolphosphonate.

HENRY TOLKMITH.

No references cited.